(12) United States Patent
Bongard et al.

(10) Patent No.: US 11,602,991 B2
(45) Date of Patent: Mar. 14, 2023

(54) SYSTEM AND METHOD FOR CONTROLLING OPERATION OF ONE OR MORE ACCESSORIES FOR A VEHICLE

(71) Applicant: ARB Corporation Ltd., Kilsyth (AU)

(72) Inventors: Daniel Bongard, Kilsyth (AU); Samuel Steward, Kilsyth (AU); Andrew Brown, Kilsyth (AU)

(73) Assignee: ARB Corporation Ltd., Kilsyth (AU)

( * ) Notice: Subject to any disclaimer, the term of this patent is extended or adjusted under 35 U.S.C. 154(b) by 386 days.

(21) Appl. No.: 16/637,187

(22) PCT Filed: Aug. 7, 2018

(86) PCT No.: PCT/AU2018/050821
§ 371 (c)(1),
(2) Date: Feb. 6, 2020

(87) PCT Pub. No.: WO2019/028501
PCT Pub. Date: Feb. 14, 2019

(65) Prior Publication Data
US 2020/0369148 A1 Nov. 26, 2020

(30) Foreign Application Priority Data

Aug. 7, 2017 (AU) ................................ 2017903116

(51) Int. Cl.
*B60K 35/00* (2006.01)
(52) U.S. Cl.
CPC ........ *B60K 35/00* (2013.01); *B60K 2370/115* (2019.05); *B60K 2370/152* (2019.05);
(Continued)
(58) Field of Classification Search
CPC .............. B60K 35/00; B60K 2370/167; B60K 2370/56; B60K 2370/115; B60K 2370/158; B60K 2370/152
See application file for complete search history.

(56) References Cited

U.S. PATENT DOCUMENTS

| | | | |
|---|---|---|---|
| 8,977,408 B1 * | 3/2015 | Cazanas | H04L 41/082 455/3.03 |
| 9,020,661 B2 * | 4/2015 | Sugihara | B60L 3/0015 701/2 |

(Continued)

FOREIGN PATENT DOCUMENTS

| | | | | |
|---|---|---|---|---|
| CA | 2898347 C | * | 2/2019 | ............. B66D 1/00 |
| KR | 20080113465 A | * | 12/2008 | ............ G06F 3/016 |

(Continued)

OTHER PUBLICATIONS

International Search Report issued in PCT Patent Application No. PCT/AU2018/050821 dated Sep. 18, 2018.
(Continued)

*Primary Examiner* — Chico A Foxx
(74) *Attorney, Agent, or Firm* — Marshall, Gerstein & Borun LLP

(57) ABSTRACT

A system comprising an interface module (IM) for receiving input and generating outputs, the IM being associated with processor (17) and memory (19); a controller module (18) (CM) that is operable independently of and communicatively connected to the IM and that is associated with processor (20) and memory (22) and that receives inputs and generates outputs to control accessories wherein each memory stores a copy of a parameter list (38) and rules governing generation of the outputs, wherein each of the IM and CM is configured such that responsive to each input, the processor of the respective module IM, CM defines a state in the associated copy of the list and communicates with the other module IM, CM to cause the state to be defined in the other copy, wherein each rule requires a state to be present in the list for generation of an associated output by each module.

21 Claims, 5 Drawing Sheets

(52) U.S. Cl.
CPC .. *B60K 2370/158* (2019.05); *B60K 2370/167* (2019.05); *B60K 2370/56* (2019.05)

(56) References Cited

U.S. PATENT DOCUMENTS

| | | | | |
|---|---|---|---|---|
| 9,043,095 | B2* | 5/2015 | Froling | G05B 19/02 701/49 |
| 11,305,651 | B2* | 4/2022 | Powell | G06V 20/593 |
| 2006/0015221 | A1 | 1/2006 | Sarkar et al. | |
| 2010/0222939 | A1* | 9/2010 | Namburu | B60R 16/037 701/1 |
| 2012/0115446 | A1* | 5/2012 | Gautama | H04W 4/44 455/414.1 |
| 2012/0179325 | A1* | 7/2012 | Faenger | B60K 35/00 701/31.4 |
| 2013/0204455 | A1 | 8/2013 | Chia et al. | |
| 2014/0088793 | A1* | 3/2014 | Morgan | B60R 16/037 701/2 |
| 2014/0257631 | A1* | 9/2014 | Heravi | G08C 17/00 254/362 |
| 2014/0309892 | A1 | 10/2014 | Ricci | |
| 2015/0128043 | A1* | 5/2015 | Sim | G06F 3/0481 715/719 |
| 2015/0180710 | A1* | 6/2015 | Cazanas | H04L 67/306 709/221 |
| 2015/0191334 | A1* | 7/2015 | Heravi | G08C 17/02 254/323 |
| 2015/0197205 | A1* | 7/2015 | Xiong | B60R 16/037 701/49 |
| 2015/0207240 | A1* | 7/2015 | Olson | H01R 4/2406 174/92 |
| 2016/0046468 | A1* | 2/2016 | Heravi | B66D 1/54 715/835 |
| 2016/0090055 | A1 | 3/2016 | Breed | |
| 2017/0072794 | A1* | 3/2017 | Buttolo | G06F 3/04842 |
| 2017/0334500 | A1* | 11/2017 | Jarek | B62K 11/12 |
| 2018/0088770 | A1* | 3/2018 | Brombach | B60K 37/06 |
| 2021/0240783 | A1* | 8/2021 | Ricci | A61B 7/04 |
| 2022/0135166 | A1* | 5/2022 | Koosmann | B62J 50/22 715/716 |

FOREIGN PATENT DOCUMENTS

| | | | | |
|---|---|---|---|---|
| KR | 20220041835 A | * | 4/2022 | ........ H04W 74/0833 |
| WO | WO-2017/024320 A1 | | 2/2017 | |
| WO | WO-2018207213 A1 | * | 11/2018 | ........... B60W 40/09 |

OTHER PUBLICATIONS

Wrtten Opinion issued in PCT Patent Application No. PCT/AU2018/050821 dated Sep. 18, 2018.

* cited by examiner

SYSTEM AND METHOD FOR CONTROLLING OPERATION OF ONE OR MORE ACCESSORIES FOR A VEHICLE

TECHNICAL FIELD

The present disclosure relates to systems and methods for controlling operation of accessories for a vehicle. In particular, the disclosure relates to a system which is configurable to automate operation of one or more of a range of 'after-market' accessories for an off-road (four-wheel-drive) vehicle, such as driving lights, a locking differential, adjustable suspension and/or an air compressor, and to a related method for operating the accessories.

BACKGROUND

Owners of off-road (commonly referred to as 4WD or 4×4) vehicles often add accessories to a vehicle (known as after-market accessories) to improve off-road driving performance and/or add functionality to the vehicle. For example, driving lights (spotlights) may be installed on the vehicle to enhance low-light visibility, which is useful when driving off-road in remote, unlit locations. Also, a locking differential may be fitted to the vehicle to allow a pair of drive shafts to be rotationally locked together to enhance traction, which is useful for driving across loose and variable terrain, such as sand.

Controlling operation of such after-market accessories usually requires installation of a user-input device in an interior cabin of the vehicle. Typically, a switch or similar mechanical device (such as a dial or button) for each accessory associated with the vehicle is installed on a dashboard of the vehicle. When many accessories are installed to the vehicle, this can result in the dashboard being cluttered with many switches/input devices which detracts from the aesthetic appeal of the cabin and can be confusing for a driver to operate.

One approach to reducing dashboard clutter is to install a control box within an engine bay of the vehicle, the control box including a plurality of relays to which each accessory associated with the vehicle is electrically connected, and install a single user-input device in the interior cabin, the input device including a complementary plurality of switches. This allows the user, operating the switches of the input device, to operate the relays between an 'on' and 'off' position and consequently activate or deactivate each accessory.

Any discussion of documents, acts, materials, devices, articles or the like included in the present specification is not to be taken as an admission that any or all of these matters form part of the common general knowledge in the field relevant to the present disclosure as it existed before the priority date of each of the appended claims.

SUMMARY

According to some disclosed embodiments, there is provided a system for controlling operation of one or more accessories for a vehicle. The system includes a configurable user interface (UI) module associated with a first processor and a first memory, the UI module configured to receive input, and configured to generate one or more outputs, the first memory storing a respective one or more UI rules governing generation of the one or more UI module outputs, and storing a copy of a shared parameter list, and a configurable controller module associated with a second processor and a second memory, the controller module being operable independently of the UI module and communicatively connected to the UI module, the controller module configured to receive input, and configured to generate one or more outputs to effect control of the one or more accessories, the second memory storing a respective one or more controller rules governing generation of the one or more controller module outputs, and storing a copy of the shared parameter list. Each of the UI module and the controller module are configured such that, responsive to each input, the processor of the respective module defines a state in the associated copy of the shared parameter list and communicates with the other module to cause the state to be defined in the other copy of the shared parameter list. Each rule requires at least one specific state to be present in the shared parameter list to cause generation of an associated output. Each of the UI module and the controller module is configured such that, responsive to each state being defined in the shared parameter list, the processor of the respective module assesses the, or each, associated rule to determine if the, or each, required state is present in the shared parameter list, and, responsive to determining the, or each, required state is present, the processor of the module effects generation of the associated output.

The controller module may be configured to receive the input responsive to at least one of: vehicle input; accessory input; and sensor input. At least one of the one or more controller rules may require at least one state to be defined in the shared parameter list responsive to a specific vehicle input or accessory input. Vehicle input is generally derived from a parameter of the vehicle, such as operation of the ignition circuit. Accessory input is generally derived from a parameter of an accessory, such as operational status. Sensor input is generally derived from a sensed parameter, such as temperature.

The controller module may be configured such that the one or more controller module outputs cause at least one of: initiating operation of at least one of the one or more accessories; ceasing operation of at least one of the one or more accessories; adjusting operation of at least one of the one or more accessories; and defining a further state in each copy of the shared parameter list.

The controller module may be further configurable to store, in the second memory, at least one further controller rule governing generation of a further output to control operation of a further accessory newly associated with the vehicle.

The UI module may be configured such that the one or more UI module outputs cause at least one of: communicating information to the user; controlling operation of the one or more accessories; and defining a further state in each copy of the shared parameter list.

The UI module may be configured such that controlling operation of the one or more accessories comprises at least one of: initiating operation of at least one of the one or more accessories; ceasing operation of at least one of the one or more accessories; and adjusting operation of at least one of the one or more accessories.

The UI module may be configured such that communicating information to the user comprises at least one of: operating a screen to display a graphic; operating a light generator to emit light; operating a speaker to emit sound; and operating a haptic feedback mechanism.

The UI module may be configured to receive the input responsive to at least one of: user input; vehicle input; and sensor input. User input is generally derived from a user operating a user interface. Vehicle input is generally derived from a parameter of the vehicle, such as operation of a headlamp. Sensor input is generally derived from a sensed parameter, such as temperature.

At least one of the one or more controller rules may require at least one state to be defined in the shared parameter list responsive to a specific user input.

The first memory may store at least one discernible interface element for each of the one or more accessories associated with the vehicle, and wherein the user input is effected via the user selecting one of the interface elements. The UI module may be further configurable to store, in the first memory, at least one further discernible interface element for a further accessory newly associated with the vehicle. The, or each, discernible interface element may be a graphic.

The UI module may be associated with and configured to operate a haptic display to display the interface elements.

The UI module may be configured as an application executable by a portable personal computing device. The portable personal computing device may be a bespoke smartphone.

Each of the UI module and the controller module may be configured such that responsive to each state being defined in the shared parameter list, the processor of the relevant module assesses the, or each, associated rule to determine if the, or each, required state is present in the shared parameter list, and, responsive to determining that the, or each, required state is not present, the relevant module ceases or modifies generation of the associated output.

The system may include a further module which is associated with a further processor and a further memory, and is operable independently of the UI module and the controller module and communicatively connected to at least one of the UI module and the controller module, the further module configured to receive inputs, and configured to generate one or more outputs, the further memory storing a respective one or more rules governing generation of the one or more outputs, and storing a copy of the shared parameter list. The further module may be a sensor module configured to sense vehicle-based information.

The controller module may be communicatively connected to at least one of the one or more accessories.

According to other disclosed embodiments, there is provided a method for controlling operation of one or more accessories for a vehicle with a system comprising a UI module in communication with a controller module, the UI module and the controller module being operable independently of each other, each of the UI module and the controller module being associated with an identical copy of a shared parameter list, and each of the UI module and the controller module being associated with one or more rules governing generation of an output by the respective module, each rule requiring at least one specific state to be present in the shared parameter list to cause generation of an associated output. The method includes: one of the UI module and the controller module receiving an input causing a state to be defined in both copies of the shared parameter list; responsive to the state being defined in the shared parameter list, a processor of one of the UI module and the controller module assessing the, or each, associated rule to determine if the, or each, required state is present in the shared parameter list; and responsive to determining the, or each, required state is present, the processor of the respective module effecting generation of the associated output.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments of the disclosure will now be described by way of example only with reference to the accompany drawings in which.

DESCRIPTION OF EMBODIMENTS

Figure 1:
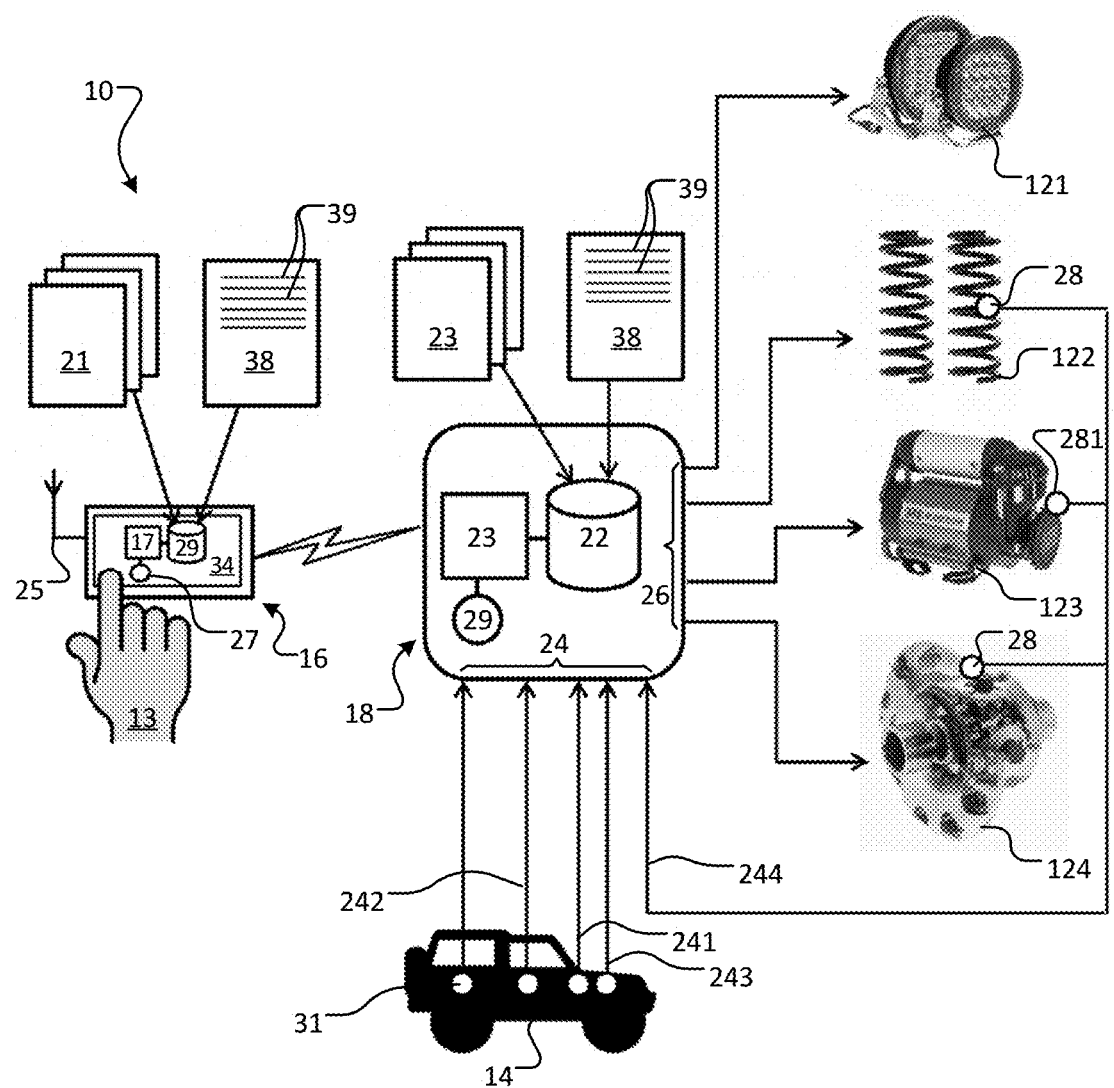
FIG. 1 is a schematic overview of an embodiment of a system for controlling operation of a plurality of accessories associated with a vehicle.

In the drawings reference numeral 10 generally designates an embodiment of a system 10 for controlling operation of one or more accessories 12 for a vehicle 14. The system 10 includes: a configurable user interface (UI) module 16 associated with a first processor 17 and a first memory 19, the UI module configured to receive input, and configured to generate one or more outputs, the first memory 19 storing a respective one or more UI rules 21 governing generation of the one or more UI module outputs, and storing a copy of a shared parameter list 38; and a configurable controller module 18 associated with a second processor 20 and a second memory 22, the controller module 18 being operable independently of the UI module 16 and communicatively connected to the UI module 16, the controller module 18 configured to receive inputs, and configured to generate one or more outputs to control operation of the one or more accessories 12, the second memory 22 storing a respective one or more controller rules 23 governing generation of the one or more controller module outputs, and storing a copy of the shared parameter list 38.

Each of the UI module 16 and the controller module 18 is configured such that, responsive to each input, the processor 17, 20 of the respective module 16, 18 defines a state 39 in the associated copy of the shared parameter list 38 and communicates with the other module 16, 18 to cause the state 39 to be defined in the other copy of the shared parameter list 38.

Each rule 21, 23 requires at least one specific state 39 to be present in the shared parameter list 38 to cause generation of an associated output. Each of the UI module 16 and the controller module 18 is further configured such that, responsive to each state 39 being defined in the shared parameter list 38, the processor 17, 20 of the respective module 16, 18 assesses the, or each, associated rule 21, 23 to determine if the, or each, required state 39 is present in the shared parameter list 38, and, responsive to determining the, or each, required state is present, the processor 17, 20 of the module 16, 20 effects generation of the associated output.

In the embodiment shown in FIG. 1, the system 10 is associated with a plurality of the accessories 12 installed to the vehicle 14. The accessories include a pair of driving lights 121, a pair of air springs 122, an air compressor 123, and a locking differential 124. At least some of the accessories 12 are associated with sensor apparatus 28. For example, each air spring 122 has a pressure sensor 281 arranged to detect air pressure within the spring 122. It will be appreciated that the illustrated range of accessories 12 is exemplary only and the system 10 is configurable to operate different accessories 12, and/or to operate more or fewer accessories 12. Furthermore, accessories 12 may be added or removed from the vehicle 14 and the system 10 reconfigured accordingly, as described in greater detail below. The system 10 therefore provides an expandable platform configurable to communicate with and operate any of a potentially vast range of accessories 12.

The UI module 16 is generally configured as an application which is executable by a personal computing device, such as a smartphone, phablet or tablet computer. Executing the UI module 16 on such a device associates the module 16 with the processor 17, the first memory store 19, a wireless communications interface 25, and one or more sensor apparatus 27 such as a GPS receiver (not illustrated), a microphone (not illustrated), a speaker/buzzer (not illustrated), or a vibration generator (not illustrated). In the embodiment shown in FIG. 1, the UI module 16 is configured as an application executed by a bespoke smartphone 30 which is configured specifically for the system 10. However it will be appreciated that the UI module 16 may alternatively be configured as an application executable by a commercially available mobile device operating system, such as "Android" or "iOS", and executed on a generic smartphone.

The UI module 16 is configurable to receive input responsive to at least one of user input, vehicle input and sensor input. Each input is then communicated to the processor 17 to be processed.

Typically, the UI module 16 is configured to provide interface controls to allow a user 13 to provide input, for example, to affect operation of any of the accessories 12 associated with the vehicle 14. The interface controls typically allow the user 13 to at least one of initiate/cease operation of at least one of the accessories 12, and adjust operational boundaries (settings) or other operational conditions for a selected accessory 12. The interface controls facilitate visual and/or audible communication of information to the user 13 as well as facilitating receipt of at least one of tactile, oral and gestural input from the user 13. In the illustrated embodiment, the UI module 16 is configured to facilitate the interface controls by operating a graphical user interface (GUI) displayed on a haptic control arrangement, in the embodiment shown in the form of a touch screen 34. Generally, the UI module 16 is configured to receive user input responsive to the user 13 operating the GUI displayed on the touch screen 34.

In this embodiment, the first memory 17 is configured to store a set of interface graphics for each accessory 12 associated with the vehicle 14. Each set of interface graphics comprises text, icons, animation and/or video configured to allow the user 13 to operate the associated accessory 12. The UI module 16 is configured to cause operation of the GUI displayed on the touch screen 34 of the smartphone 30 to display any set of the interfaces graphics to receive user inputs. The UI module 16 may also be configured to cause operation of a microphone of the smartphone 30 to receive oral input from the user 13, and/or cause operation of a camera of the smartphone 30 to receive gestural input from the user 13. Examples of the interface graphics are illustrated in FIGS. 2A to 8 which are screenshots of the UI module 16 causing operation of the touch screen 34.

The system 10 is expandable to accommodate additional accessories 12 to be added to the vehicle 14, as the system 10 is readily reconfigurable to enable operation of any additional accessory 12. Thus, when a further accessory 12 is newly added to the vehicle 14, the UI module 16 causes the first memory 19 to be reconfigured to store an additional set of interface graphics which are configured to allow a user 13 to operate the additional accessory 12, and is configurable to execute the additional interface graphics. Reconfiguring the first memory 19 involves the further user interface being received from a remote memory store, such as a cloud-based store via the Internet. Similarly, the further user interface may be communicated to the memory 19 from the remote memory store via a wired, typically USB, or wireless, typically Bluetooth or other near field communication (NFC), connection.

In the illustrated embodiment, the UI module 16 is configured to receive sensor input responsive to the sensor apparatus 27 sensing a parameter. For example, where the sensor apparatus 27 includes a GPS receiver, the UI module 16 is configured to receive sensor input from the sensor apparatus 27 identifying a position, bearing and altitude of the smartphone 30. It will be appreciated that the sensor input is not limited to receiving sensor information from sensor apparatus 27 integrated with the smartphone 30 and instead, the UI module 16 is configurable to communicate with, and receive input from, other sensor apparatus, such as may be remotely located from the smartphone 30, for example, installed to the vehicle 14 or any of the accessories 12.

The UI module 16 may be further configured to receive vehicle input from electrical systems and/or sensors integrated in the vehicle 14 via the wireless communication interface 25. For example, where a controller area network (CAN bus) of the vehicle 14 is configured for wireless communication, such as having a Bluetooth dongle associated therewith, the UI module is configured to receive vehicle input from the CAN bus via the wireless communication interface 25. This can allow a wide range of vehicle-based information to be received and processed by the UI module processor 17.

Following receipt of each input, the UI module 16 causes the associated processor 17 to define a state 39 in the associated copy of the shared parameter list 38 and communicates with the controller module 18 to cause its associated processor 20 to define the new state 39 in its associated copy of the shared parameter list 38, as will be described in greater detail below.

Executing the UI module 16, by the smartphone 30, causes the one or more UI rules 21 to be stored in the first memory 19. Each of the rules 21 are configured to require at least one specific state 39 to be present in the shared parameter list 38 in order to cause generation of an output. Each output is configured to cause at least one of communicating information to the user 13, controlling operation of the one or more accessories 12, and defining a further state 39 in each copy of the shared parameter list 38. It will be appreciated that the first memory 19 may be reconfigured to store one or more additional rules 21, such as relating to control of one or more further accessories 12 newly added to the vehicle 14, by receiving data from the remote memory store, as described above.

Where the UI module 16 output is configured to communicate information to the user 13, this typically involves at least one of operating the touch screen 34 to display a graphic, including displaying text and/or animation, operating a light generator to emit light, operating a speaker to emit sound, including series of sounds such as to articulate speech, and operating a haptic feedback mechanism, such as a vibration generator.

Where the UI module 16 output is configured for controlling operation of the one or more accessories 12, this typically involves communicating with the at least one or more accessories via the wireless communication interface 25 to cause at least one of initiating operation of at least one of the one or more accessories 12, ceasing operation of at least one of the one or more accessories 12, and adjusting operation of at least one of the one or more accessories 12.

Alternatively, the UI module 16 output may be configured to cause operation of the wireless communications interface 25 to transmit information. This may involve communicating with the vehicle 14, for example, to cause sound to be emitted from a stereo integrated in the vehicle 14. Alternatively, this may involve sending data via the Internet, for example, to automatically send an email, or other message format, to a predefined recipient, or to transmit location data to a website or mapping application.

The controller module 18 includes a ruggedized housing 36 containing electronic components, including the processor 20, the second memory store 22, and a communication interface, in the embodiment shown being a wireless communication interface, as illustrated by the lightning symbol in FIG. 1, to allow communication with the UI module 16. The communication interface may also allow communication with the remote memory store via the UI module 16.

The housing 36 is configured to be affixed to the vehicle 14, for example, within an engine bay or under a dashboard, and is configured to protect the electronics from dust and moisture ingress. The housing 36 is, in use, rigidly affixed to the vehicle 14 to transmit forces from the vehicle 14 to a sensor apparatus 29 associated with the housing 36. For example, the sensor apparatus 29 may comprise an array of accelerometers contained within the housing 36 and the housing 36 be affixed to the vehicle 14 such that vibration, tilting and other mechanical shocks/loads imparted to, or generated by, the vehicle 14, such as is typical when driving the vehicle 14 off-road, are communicated to the sensor apparatus 29. This then allows the processor 20 of the controller module 18 to determine operating parameters of the vehicle 14, such as vehicle attitude, more particularly, body roll and pitch. Alternatively, the sensor apparatus 29 may include a thermometer to measure temperature within or proximal to the housing 36 of the controller module 18.

The controller module 18 is configurable to receive input responsive to at least one of vehicle input, accessory input and sensor input. Each input is then communicated to the processor 20 to be processed.

In the illustrated embodiment, the controller module 18 includes a plurality of analogue and/or digital inputs 24. At least one input 24 is configured to receive vehicle input from the vehicle 14, and communicate each input to the processor 20. The inputs 24 are generally configured to communicate with an electrical system and/or sensor apparatus integrated with the vehicle 14. For example, one input 241 is configured to communicate with an engine management electronic control unit in the vehicle 14 to allow detection of various vehicle 14 parameters, such as detecting operation of the vehicle's ignition circuit, and to communicate the parameters to the processor 20. Another input 242 is configured to communicate with interior cabin occupancy sensors integrated in the vehicle 14 to detect occupants within the cabin, and to communicate occupancy status to the processor 20. A further input 243 is configured to communicate with the vehicle's lighting system to detect operation of any integrated lamp.

At least one input 24 is configured to receive accessory input either directly from one of the accessories 12 or from a sensor apparatus 28 arranged to sense a parameter of at least one of the accessories 12. For example, compressor 123 is associated with sensor apparatus 281 configured as a thermocouple. An input 244 receives operational parameter information from the sensor apparatus 281 to allow a temperature of the compressor 123 to be monitored.

Another input 24 may be configured to receive sensor input responsive to an auxiliary sensor apparatus 31 arranged to sense a parameter, such as a vehicle parameter, an accessory parameter, or a local environment parameter. For example, the sensor apparatus 31 may be arranged within the cabin of the vehicle 14 to sense internal environmental conditions. Alternatively, the sensor apparatus 31 may include a battery condition monitor, such as a volt sensor. Further alternatively, the sensor apparatus 31 may include a thermocouple arranged to sense a temperature of a specific engine component, such as turbo temperature.

The sensor input is typically received by the controller module 18 via the wireless communications interface. It will be appreciated that the sensor input is not limited to sensor information received from sensor apparatus 31 associated with the vehicle and instead, the controller module 18 is configurable to communicate with, and receive input from, other sensor apparatus, such as may be remotely located from the vehicle 14, for example, located in a campsite or dwelling.

The controller processor 20, in the embodiment shown, comprises a single central processing unit, however it will be appreciated the processor 20 may comprise a plurality of central processing units, such as a dual-core or quad-core arrangement, to allow multiprocessing. The second memory store 22 is configured as a solid-state memory store however it will be appreciated that other types of memory storage solutions are within the scope of this disclosure.

The second memory 22 is configured to store a default range of the controller rules 23 relating to a complementary default range of the accessories 12. The memory 22 may be subsequently reconfigured to also store one or more further controller rules 23 relating to a one or more further accessories 12 which are subsequently added to the vehicle 14. The further controller rules 23 are typically received from the remote memory store as described above, via a wired or wireless connection. This may involve the further controller rules 23 being communicated to the second memory 22 via the UI module 16.

Following receipt of each input, the controller processor 20 defines a state 39 in the associated copy of the shared parameter list 38 and communicate with the UI module 16 to cause its associated processor 17 to define the state 39 in its associated copy of the shared parameter list 38, as will be described in greater detail below.

In the illustrated embodiment, the controller module 18 includes a plurality of analogue and/or digital outputs 26. The outputs 26 facilitate communicating an output signal generated by the processor 20 to any of the accessories 12. Communicating the output signal thereby effects control of the accessory 12.

The UI module 16 and the controller module 18 are independently operable of each other. This means that should one module 16, 18 be disconnected from the system 10, the other module 16, 18 will continue to operate in accordance with the most recent state 39 defined in the shared parameter list 38 by the deactivated module 16, 18. For example, if the smartphone 30 executing the UI module 16 loses power, or is removed from the vehicle 14 and displaced sufficiently to prevent wireless communication with the controller module 18, the controller module 18 continues to operate in accordance with the last state 39 defined by the UI module 16 in the shared parameter list 38.

In some embodiments, the system 10 includes one or more further modules (not illustrated), such as a sensor module configured to sense vehicle-based information. For example, a tyre pressure monitoring system which communicates via radio frequency signal with tyre pressure sensors integrated in the vehicle 14. Each further module is associated with a further processor and a further memory, and is operable independently of the UI module 16 and the controller module 18 and communicatively connected to at least one of the UI module 16 and the controller module 18. Each further module is configured to receive input, and configured to generate one or more outputs, and the further memory stores a respective one or more rules governing generation of the one or more outputs, and stores a copy of the shared parameter list 38.

Figure 2:
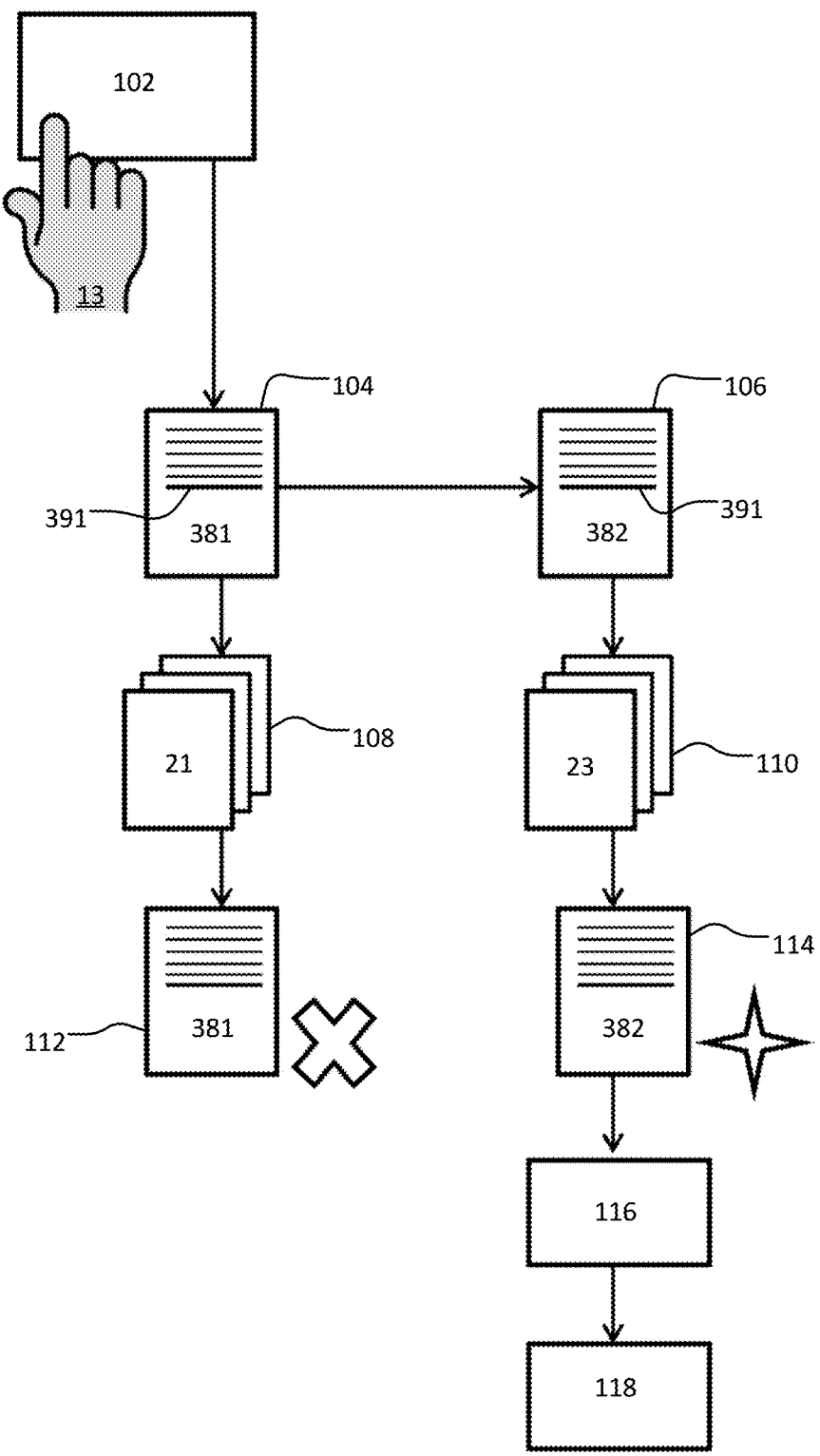
FIG. 2 is a diagram illustrating the system shown in FIG. 1 operating one of the accessories.

FIG. 2 illustrates the system 10 in use, where a user input causes a selected accessory 12 to be operated.

At 102, the user 13 operates the GUI displayed on the touch screen 34 to provide user input, by selecting instantaneous operation of the selected accessory 12. This causes the processor 17 of the UI module 16, at 104, to define a state 391 in the associated copy of the shared parameter list 381 and communicate with the controller module 18 to cause the controller processor 20 to define the state 391 in its copy of the shared parameter list 382, at 106.

Responsive to the new state 391 being defined in each copy of the shared parameter list 38, each of the UI module 16 and the controller module 18 cause its associated processor 17, 20 to assess the associated rules 21, 23. At 108, the processor 17 of the UI module 16 reviews each UI rule 21 to determine if each state 39 required by any of the rules 21 is present in the shared parameter list 381. At 110, typically executed simultaneously, the processor 20 of the controller module 18 reviews each controller rule 23 to determine if each state 39 required by any of the rules 23 is present in the shared parameter list 382.

At 112, the UI processor 17 determines that none of the UI rules 21 are satisfied by the states 39 defined in the shared parameter list 381, and therefore does not generate an output. Conversely, at 114, the controller processor 20 determines that each state 39 required by the controller rule 23 relating to operation of the selected accessory 12 is present in the shared parameter list 382, causing the processor 20 to determine that the rule 23 is satisfied and generating an output signal at 116.

At 118, the selected accessory 12 receives the output signal, causing the accessory 12 to commence operation.

It will be appreciated the above is a simple example of the system 10 during operation and that operation of the system 10 may be significantly more complex and/or comprise alternative steps. For example, it will be understood that, using the same process as described above but substituting the user input received by the UI modules for a vehicle input received by the controller module, this can cause the UI module 16 to determine that one of the UI rules 21 is satisfied by the states 39 defined in the shared parameter list 381, and then generate a UI module output. For example, this output may involve emitting a discernible alarm from the smartphone 34 to communicate with the user 13. Alternatively the UI module output may cause an output signal to be transmitted, via the wireless communications interface 25, to one of the accessories 12 to cause operation of the accessory 12. The latter may be appropriate where the accessory 12 is arranged within the vehicle 14 cabin and is configured for wireless communication, such as a Bluetooth enabled fridge, as the smartphone 30 is typically more optimally located for wirelessly communicating with the accessory 12.

In some embodiments, generating an output by either module 16, 18 causes another state 39 to be defined in the shared parameter list. This is usually appropriate where it is useful for the other module 16, 18 to assess the state 39, for example, as this may prompt the module 16, 18 to effect an output.

In some use scenarios, the user 13, operating the GUI, confirms a setting for the selected accessory 12, such as a lamp brightness or air pressure. When this occurs, this causes a state 39 to be defined in each copy of the shared parameter list 381, 382, as described above. Should this state 39 mean that one of the rules 21, 23 is then satisfied, the respective module 16, 18 then causes the associated output to be generated.

Each UI rule 21 and controller rule 23 requires at least one specific state 39 to be present in the shared parameter list 38 to cause an output to be generated. Some rules 21, 23 can be complex, requiring a significant number of different states 39 to be present in the shared parameter list 28 in order to effect generating the associated output. This may involve a rule 21,23 being configured to require the presence of states 39 generated responsive to at least one vehicle input, at least one accessory input, at least one user input, and/or at least one sensor input.

At least one UI rule 21 and/or at least one controller rule 23 defines a hierarchical structure comprising a lower level, requiring at least one specific state 39 to be defined in the shared parameter list 38, and a higher level, requiring at least one alternative specific state 39 to be defined in the shared parameter list 38, whereby the presence of the lower level required state(s) 39 or higher level required state(s) causes the associated output to be generated. The at least one alternative specific state 39 is typically defined responsive to a specific user input or a specific vehicle input. In this embodiment, when the at least one alternative specific state 39 is present in the shared parameter list 38, the rule 21, 23 defers to the higher level. This effectively allows the user 13, providing the user input, or a predefined safety limitation, provided by the vehicle input, to override the lower level requirements of the rule.

Referring again to FIG. 2, at 108 and 110, prompted by the new state 391 being defined in the shared parameter list 38, the UI processor 17 and the controller processor 20, respectively, assess the associated rules 21, 23 to determine if the state(s) 39 required by any rule 21, 23 are present in the shared parameter list 38. This assessment also involves each processor 17, 20 determining if a satisfied rule 21, 23 is no longer satisfied, i.e. where the state(s) required by that rule 21, 23 were defined in the list 38 however, due to the new state 391, the required state(s) are no longer defined in the list 38. Where this is determined, the respective processor 17, 20 ceases or modifies generation of the associated output.

The continuous assessment of each UI rule 21 and controller rule 23 by the UI processor 17 and controller processor 20, respectively, in this way allows the system 10 to monitor operation of each accessory 12 and/or the vehicle 14. This can be useful to determine if operational parameters of the accessories 12 are within a predetermined optimal range, for example, to prevent damage or wear to the accessory 12 and/or the vehicle 14.

FIGS. 3A to 9 show screenshots of the UI module 16 during various stages of use, showing the UI module 16 causing the touch screen 34 to display various user interface elements as the GUI. Each selection of an option or setting by the user 13 operating the touch screen 34 is processed by the UI module 16 as setting a state 39 and causes the processor 17 to define each interaction as a state 39 in the shared parameter list 38.

Figure 3A:
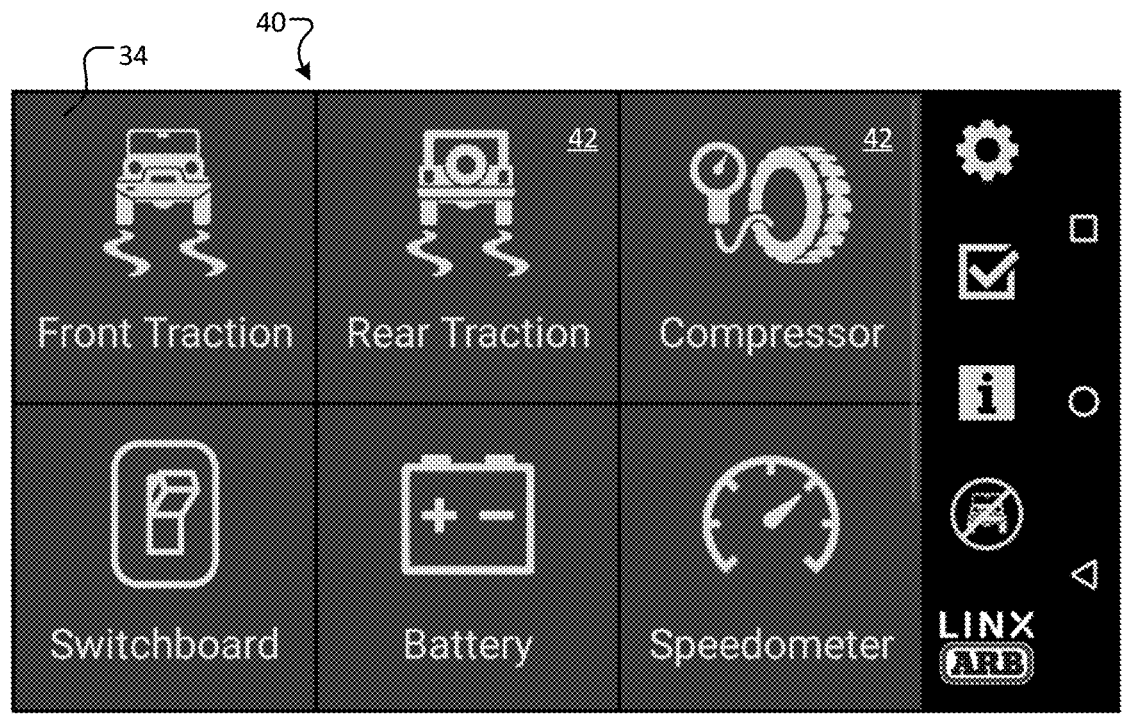
FIGS. 3A and 3B show screenshots of a first-level view of a graphical user interface (GUI) executed by the system shown in FIG. 1, the first-level view showing an overview of at least some of the accessories the system shown in FIG. 1 is configured to operate.
Figure 3B:
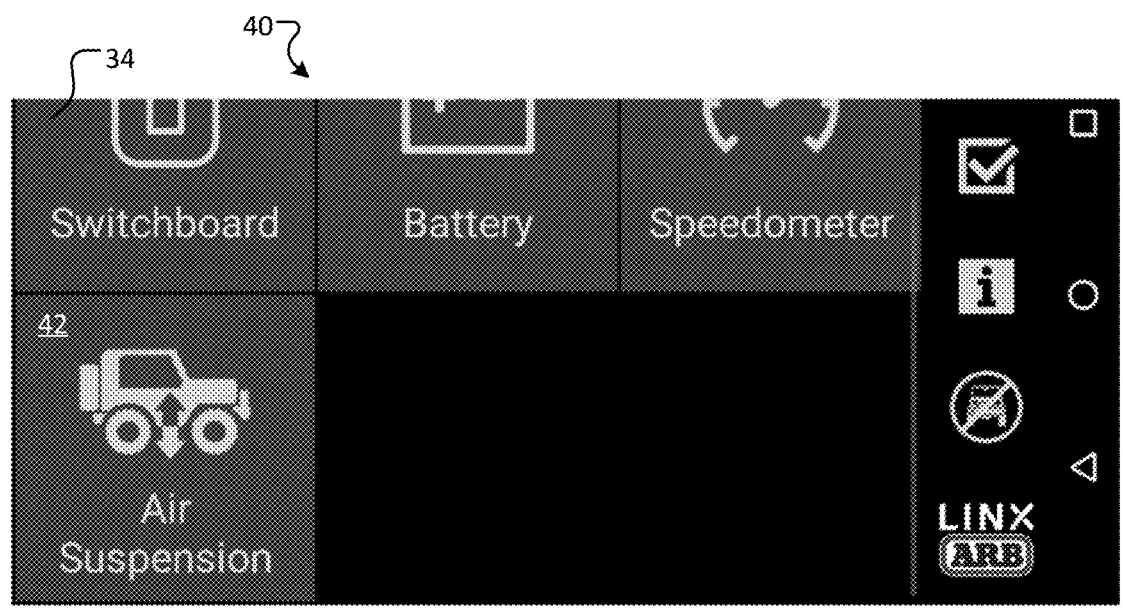

FIGS. 3A and 3B show a first-level view of the GUI illustrating a system overview 40 which identifies all of the accessories 12 associated with the vehicle 14, and therefore the range of accessories 12 which the system 10 is presently configured to operate. Each accessory 12 is represented by an icon and text on a tile 42. In the embodiment shown, the UI module 16 is configured so that when the user 13 touches one of the tiles 42 this causes an action, for example, loading a menu for the accessory 12 associated with the activated tile 42.

FIG. 3A shows a top section of the overview 40 and FIG. 3B shows a bottom section of the overview 40. As can be seen from the blank tiles 44 shown in FIG. 3B, the overview 40 is expandable to display additional tiles 42 for additional accessories 12 should these be added to the vehicle 14 and the system 10 be reconfigured to operate them.

Figure 4:
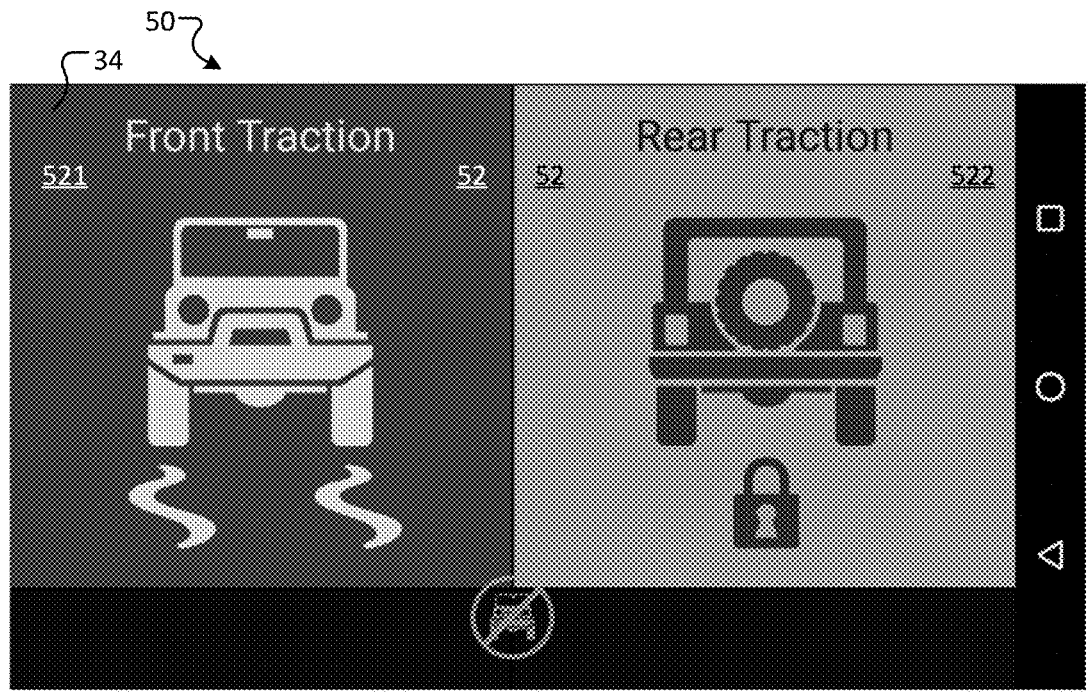
FIGS. 4 and 5 show screenshots of two second-level views of the GUI, being different accessory tile arrangements.

FIG. 4 shows a second-level split-screen view 50 of the GUI showing two tiles 52 representing two different accessories 12 associated with the vehicle 14, being two locking differentials 124. The tile 521 represents the differential 124 arranged between a pair of front axles in the vehicle 14 and the tile 522 represents the differential 124 arranged between a pair of rear axles.

In the GUI configuration shown in FIG. 4, the tiles 521, 522 are configured to allow instantaneous operation of the respective differential 124. When the user 13 touches either tile 521, 522, this causes a state 392 relating to the relevant differential 124 to be defined in each copy of the shared parameter list 38. Responsive to this state 392 being defined, the controller processor 20 reviews the controller rules 23, including a rule 231 which governs generating an output to control operation of the rear differential 124. Subject to each state 39 required by this rule 231 being present in the shared parameter list 38, the controller module 18 generates an output which causes operation of a solenoid to allow pressurised air to enter the rear differential 124 to engage a gear to rotationally lock the rear axles together. Once locked, the controller module 18 defines this as a further state 393 in each copy of the shared parameter list 38. Responsive to this further state 393 being defined in the list 38, the UI processor 17 reviews the UI rules 21, including a rule 211 which governs generating an output to communicate operational status of the rear differential 124. Subject to each state 39 required by this rule 211 being present in the shared parameter list 38, the UI module 16 generates an output which causes the GUI to display a lock icon 54, as shown in tile 522.

In some embodiments, rule 231 may also require a state 394 relating to pressure of air stored in an air tank being above a threshold to be present in the shared parameter list 38 in order to generate the output. If the pressure threshold is exceeded, state 394 would have previously been defined in the list 38. If so, responsive to the user input causing state 392 to be defined in the list 38, the controller module 18 would cause generation of the output to cause operation of the solenoid to lock the rear differential 124.

Alternatively, rule 231 may require states 392, 394 and a further state 395 relating to engagement of the rear differential locking gear to be present in the shared parameter list 38 in order to generate the output. In this scenario, even when the 'instantaneous operation' user input is provided to cause state 392 to be defined in the shared parameter list, the output would not be generated until state 395 is defined in the list 38, i.e. only when the rear differential is locked. This means that rule 231 defers activation of the rear differential 124 until all required states 392, 394, 395 are present.

In addition, or instead, either of the differentials 124 may be configured as an adjustable limited slip differential (LSD) (not shown), and the system 10 be configured to operate, including cause adjustment, of each LSD. For example, the LSD may be operated by a pneumatic clutch to effect slip between clutch plates to limit relative rotation of connected axles, and the clutch is operable to effect a bias between 0-100%, whereby 0% is an open differential position and 100% is a fully locked differential position. In this scenario, the UI module 16 is configured to display interface graphics on the touch screen 34 to allow the user 13 to set the clutch bias between 0-100%. When the user 13 sets the bias, this causes the UI module 16 to define this bias value as a state 39 in the parameter list 38. This then causes the controller processor 20 to assess the controller rules 23 and, subject to the bias value state 39 meaning that each required state(s) 39 of the rule 23 governing differential output being satisfied, the controller processor 20 causes the differential output to be generated to operate the clutch to effect the required bias.

Figure 5:
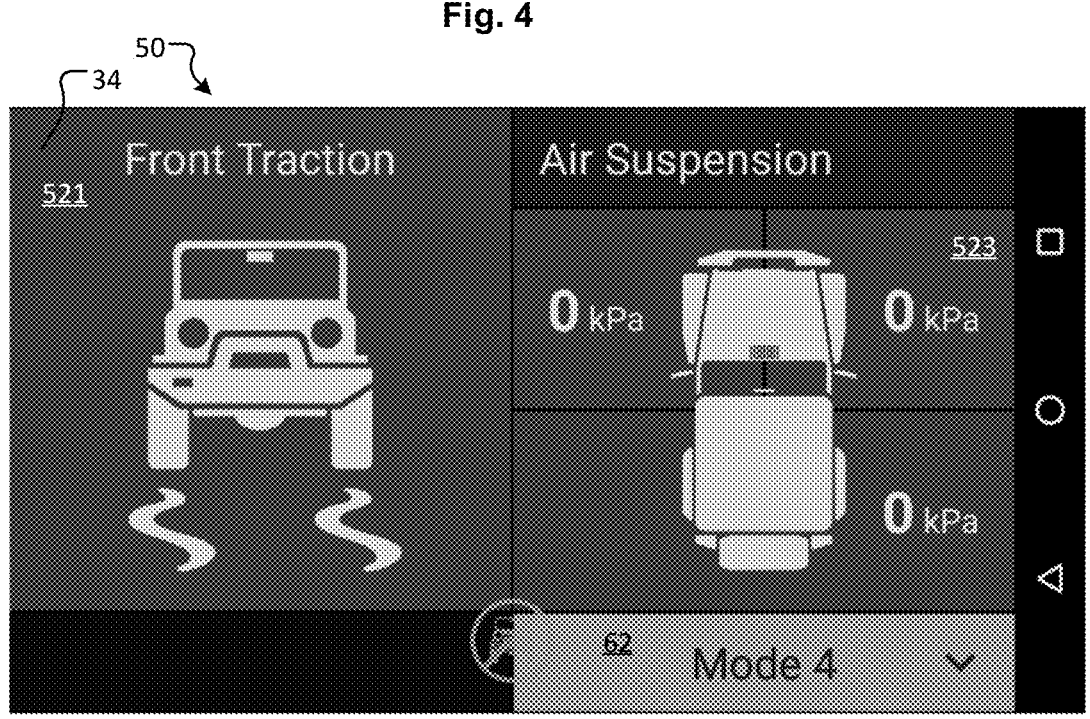

FIG. 5 shows an alternative split-screen view 60 displayed on the touch screen 34 of the UI module 16 displaying the front differential tile 521 and an air suspension tile 523 representing four air springs 122 arranged in front and rear suspension assemblies to suspend each wheel of the vehicle 14. To access the alternative split-screen view 60 from the first split-screen view 50, the user 13 operates the touch screen 34 to slide the rear differential tile 522 across the GUI. In the embodiment shown, the tiles 52 are arranged on a virtual wheel which is rotatable about a horizontal axis so that sliding any tile 52 vertically causes the tiles 52 to scroll. This therefore allows the user 13 to scroll between tiles 52 to view all of the accessories 12 associated with the vehicle 14 and which the system 10 is configured to operate.

The air suspension tiles 523 include a drop-down menu 62. When the user 13 touches the drop-down menu 62 icon displayed on the touch screen 34, the UI processor 17 operates the touch screen 34 to display various operational mode options, such as "Mode 4" shown in FIG. 4. For example, a first mode may be configured to set air pressure in all springs 122 to stiffen the suspension of the vehicle 14 which is useful for on-road driving. Alternatively, a second mode may be configured to soften the suspension of the vehicle which is useful for travelling across rough, off-road terrain. Responsive to the user 13 selecting one of the mode options, this causes one or more states 39 to be defined in each copy of the shared parameter list 38, causing each module processor 17, 20 to assess its associated rules 21, 23 and, if appropriate, generate an output, as described above.

Figure 6:
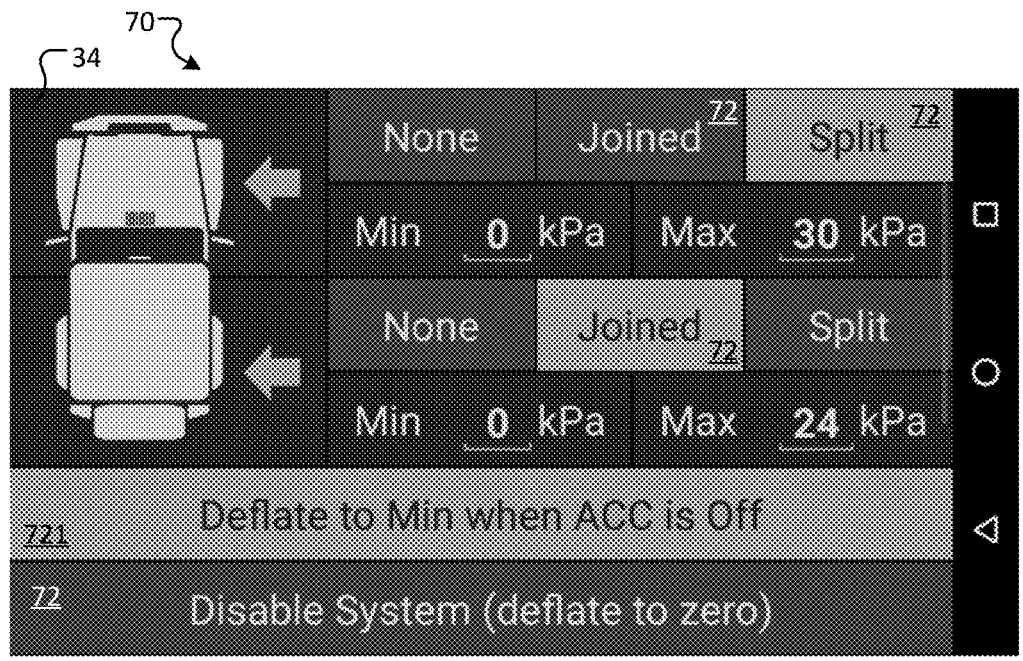
FIG. 6 shows a screenshot of a third-level view of the GUI, being a menu of operational settings for one of the accessories.

FIG. 6 shows a third-level view 70 of the GUI displaying various settings for the air springs 122 which can be adjusted by the user operating setting tiles 72. This allows the user 13 to fine-tune operating parameters for one of the operational modes (described above). Operating the setting tiles 72 allows the user 13 to manually affect operating parameters for each air spring 122 to tailor vehicle 14 ride characteristics according to personal preferences. Once the user 13 has operated the setting tiles 72 and then operates the GUI to return to the air suspension tile 523 view, this causes the UI processor 17 to define at least one new state 39 in the parameter list 38.

In some embodiments, the controller rule 232 governing generation of output to control operation of the air springs 122 may be configured to cease generating the output when state 396, relating to a deactivated ignition status, is present in the shared parameter list 38, and only assesses the presence of state 396 when a state 397 relating to a specific user input is present. In this scenario, if the user selects setting tile 721 "deflate to min when ACC is off" (to decrease load on the vehicle's battery when the ignition is not active), this causes state 397 to be defined in each copy of the shared parameter list 38. Responsive to this state 397 being defined in the shared parameter list 38, and the ignition previously being deactivated causing state 396 to be defined in the list 38, the controller processor 20 assesses each controller rule 23, including rule 232, and determines that state 396 and 397 mean that the air spring 122 output should cease being generated, resulting in deflation of the air springs 122.

Figure 7:
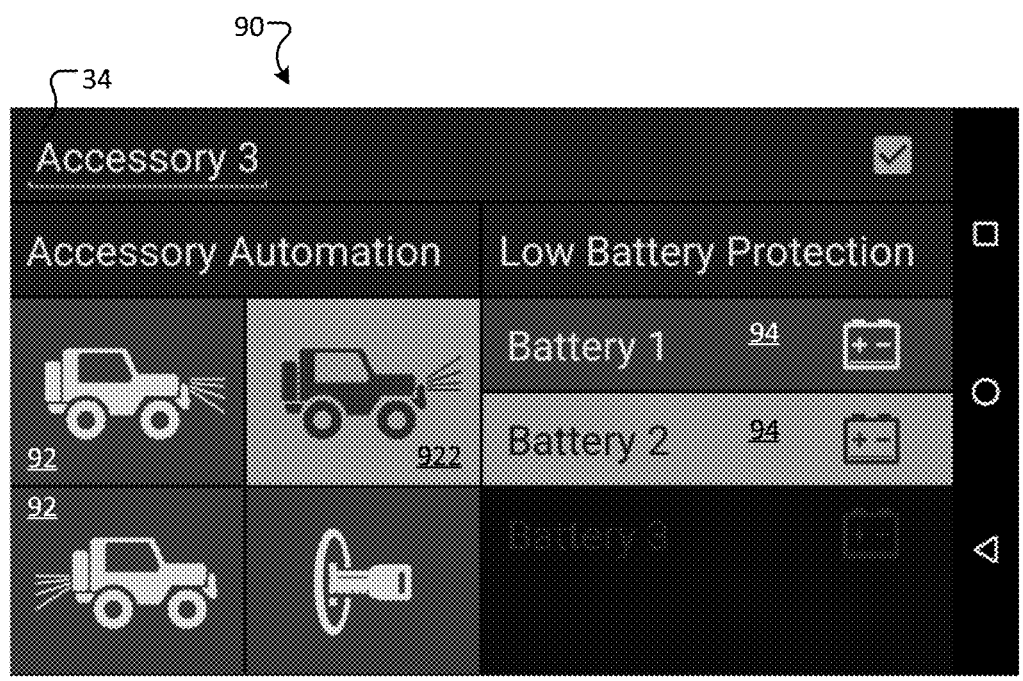
FIG. 7 shows a screenshot of a third-level view of the GUI, being a menu of operating conditions for one of the accessories.

FIG. 7 shows an alternative third-level menu view 90 of the GUI displaying information relating to "Accessory 3", in this case, being the driving lights 121. The menu includes various automation tiles 92, 94. When the user 13 operates any of the automation tiles 92, 94, this causes one or more states 39 relating to the driving lights 121 to be defined in each copy of the shared parameter list 38. The, or each, state 39 define a setting for the driving lights 121 which effectively establish an operating condition. For example, operating highlighted automation tile 922 defines a state 398 in each copy of the shared parameter list 38 linking operation of the driving lights 121 to operation of the vehicle's high beam headlamps. This causes each module 16, 18 to assess its associated rules 21, 23 as described above. In some embodiments, the controller rule 233 governing generation of an output to effect control of the driving lights 122 is hierarchical, whereby the rule 233 has a lower level requiring any headlamp to be operational to allow operation of the driving lights 122, and a higher level deferring to any user set headlamp state, such as state 398. In this embodiment, once the user input has defined the state 398, this effectively delays operation of the driving lights 122 until the user 13 also operates the vehicle's high beam headlamps.

The disclosed system 10 provides at least two independently operable modules 16, 18, each module 16, 18 being configured to receive input, share the input with the other module 16, 18 via the dynamically updated copies of the shared parameter list 38, and, responsive to the input meaning that the requirements of a rule 21, 23 is satisfied, generating an output associated with that rule 21, 23, such as to operate one of the accessories 12. This advantageously allows the system 10 to benefit from any of the range of inputs which each module 16, 18 is configured to receive, and generate the output from the module 16, 18 which is most optimally configured and/or arranged to achieve a desired effect. This therefore allows the system 10 to receive and process a potentially vast range of information in order to achieve an objective.

The system 10 advantageously allows operation of any of the one or more accessories 12 installed on the vehicle 14 to be conveniently controlled by the user 13 operating the UI module 16 and, once operation of the accessory 12 has been initiated, the operation of the accessory 12 to be automated according to conditional operating parameters (defined in the rules 21, 23). Operation of the accessories 12 can be complex as this may involve adjusting operational parameters, operating further complementary accessories at the same time, and/or only operating the accessory 12 when a plurality of defined operating conditions have been satisfied. The system 10 therefore significantly advances the sophistication of control of such accessories 12 allowing performance of each accessory 12 to be optimised, and consequently improving efficiency and durability of the accessories 12.

The system 10 may usefully provide an expandable platform configurable to control a potentially vast range of accessories 12. This is because each module 16,18 is configurable to store rules 21, 23 governing the generation of outputs which effect control of any accessory 12 associated with the vehicle 14, and further configurable to store one or more additional rules 21, 23 governing the generation of outputs which effect control of one or more additional accessories 12 which are newly associated with the vehicle 14. The system 10 is therefore highly adaptable and can consequently provide a potentially broad range of functionality to enhance the vehicle 14, by operating many different accessories 12.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A system for controlling operation of one or more after-market accessories installed to an off-road vehicle, the system comprising:

a configurable user interface (UI) module associated with a first processor and a first memory, the UI module configured to receive input from a user operating the UI module, and configured to generate one or more UI outputs, the first memory storing a respective one or more UI rules governing generation of the one or more UI outputs, and storing a copy of a shared parameter list; and a configurable controller module associated with a second processor and a second memory, the controller module being operable independently of the UI module and communicatively connected to the UI module, the controller module configured to receive input from at least one of the vehicle and the one or more accessories, and configured to generate one or more control outputs to effect control of the one or more accessories, the second memory storing a respective one or more controller rules governing generation of the one or more control outputs, and storing a copy of the shared parameter list, each of the UI module and the controller module configured such that, responsive to each input received by the respective module, each of the first processor and the second processor defines a state in the associated copy of the shared parameter list and communicates with the other module to cause the state to be defined in the other copy of the shared parameter list, wherein each UI rule and control rule requires at least one specific state to be present in the shared parameter list to cause generation of an associated UI or control output, and each of the UI module and the controller module is configured such that, responsive to each state being defined in the shared parameter list, each of the first processor and the second processor assess the one or more UI or controller rules to determine if the at least one required state of any rule is present in the shared parameter list, and, responsive to determining the at least one required state of one of the rules is present, the respective processor effects generation of the associated UI or control output.

2. The system according to claim 1, wherein the controller module is further configured to receive the input from a sensor associated with the vehicle or the one or more accessories.

3. The system according to claim 2, wherein at least one of the one or more controller rules requires at least one state to be defined in the shared parameter list responsive to a specific accessory input.

4. The system according to claim 1, wherein the controller module is configured such that the one or more control module outputs cause at least one of: initiating operation of at least one of the one or more accessories; ceasing operation of at least one of the one or more accessories; adjusting operation of at least one of the one or more accessories; and defining a further state in each copy of the shared parameter list.

5. The system according to claim 1, wherein the controller module is further configurable to store, in the second memory, at least one further controller rule governing generation of a further output to control operation of a further accessory newly associated with the vehicle.

6. The system according to claim 1, wherein the UI module is configured such that the one or more UI outputs cause at least one of:
communicating information to the user; controlling operation of the one or more accessories;
and defining a further state in each copy of the shared parameter list.

7. The system according to claim 6, wherein the UI module is configured such that controlling operation of the one or more accessories comprises at least one of:
initiating operation of at least one of the one or more accessories; ceasing operation of at least one of the one or more accessories; and adjusting operation of at least one of the one or more accessories.

8. The system according to claim 6, wherein the UI module is configured such that communicating information to the user comprises at least one of:
operating a screen to display a graphic; operating a light generator to emit light; operating a speaker to emit sound; and operating a haptic feedback mechanism.

9. The system according to claim 1, wherein the UI module is configured to receive the input responsive to at least one of: user input; vehicle input; and sensor input.

10. The system according to claim 9, wherein at least one of the one or more controller rules requires at least one state to be defined in the shared parameter list responsive to a specific user input.

11. The system according to claim 9, wherein the first memory stores at least one discernible interface element for each of the one or more accessories associated with the vehicle, and wherein the user input is effected via the user selecting one of the interface elements.

12. The system according to claim 11, wherein the UI module is further configurable to store, in the first memory, at least one further discernible interface element for a further accessory newly associated with the vehicle.

13. The system according to claim 11, wherein the, or each, discernible interface element is a graphic.

14. The system according to claim 11, wherein the UI module is associated with and configured to operate a haptic display to display the interface elements.

15. The system according to claim 1, wherein the UI module is configured as an application executable by a portable personal computing device.

16. The system according to claim 15 wherein the portable personal computing device is a bespoke smartphone.

17. The system according to claim 1, wherein each of the UI module and the controller module is configured such that responsive to each state being defined in the shared parameter list, the processor assesses the, or each, associated rule to determine if the, or each, required state is present in the shared parameter list, and, responsive to determining that the, or each, required state is not present, the relevant module ceases or modifies generation of the associated output.

18. The system according to claim 1, comprising a further module, the further module being associated with a further processor and a further memory, the further module being operable independently of the UI module and the controller module and communicatively connected to at least one of the UI module and the controller module, the further module configured to receive inputs, and configured to generate one or more outputs, the further memory storing a respective one or more rules governing generation of the one or more outputs, and storing a copy of the shared parameter list.

19. The system according to claim 18, wherein the further module is a sensor module configured to sense vehicle-based information.

20. The system according to claim 1, wherein the controller module is communicatively connected to at least one of the one or more accessories.

21. A method for controlling operation of one or more after-market accessories installed to an off-road vehicle, with a system comprising a UI module in communication with a controller module, the UI module and the controller module being operable independently of each other, each of the UI module and the controller module being associated with an identical copy of a shared parameter list, and each of the UI module and the controller module being associated with one or more UI or controller rules governing generation of a UI or control output by the respective module, each rule requiring at least one specific state to be present in the shared parameter list to cause generation of the associated output, the method including:
one of the UI module and the controller module receiving an input, causing the module to define a state in both copies of the shared parameter list;
responsive to the state being defined in the shared parameter list, each module causing a respective processor to assess one or more rules to determine if the at least one required state is present in the shared parameter list; and
responsive to determining the at least one required state is present, the respective processor effecting generation of the associated UI or control output.

* * * * *